(12) United States Patent
Törncrona (10) Patent No.: US 12,195,344 B2
(45) Date of Patent: Jan. 14, 2025

(54) CHARGE-REVERSED SILICA SOL (71) Applicant: NOURYON CHEMICALS INTERNATIONAL B.V., Arnhem (NL)

(72) Inventor: Anders Törncrona, Bohus (SE)

(73) Assignee: NOURYON CHEMICALS INTERNATIONAL B. V., Arnhem (NL)

( * ) Notice: Subject to any disclaimer, the term of this patent is extended or adjusted under 35 U.S.C. 154(b) by 925 days.

(21) Appl. No.: 16/976,150

(22) PCT Filed: Feb. 28, 2019

(86) PCT No.: PCT/EP2019/054928
§ 371 (c)(1),
(2) Date: Aug. 27, 2020

(87) PCT Pub. No.: WO2019/166526
PCT Pub. Date: Sep. 6, 2019

(65) Prior Publication Data
US 2021/0002139 A1 Jan. 7, 2021

(30) Foreign Application Priority Data

Mar. 2, 2018 (EP) .................................. 18159789
Mar. 21, 2018 (EP) .................................. 18163196

(51) Int. Cl.
*C01B 33/146* (2006.01)
*C01B 33/143* (2006.01)

(52) U.S. Cl.
CPC ........ *C01B 33/1435* (2013.01); *C01B 33/146* (2013.01)

(58) Field of Classification Search
CPC .......................... C01B 33/1435; C01B 33/146
See application file for complete search history.

(56) References Cited

U.S. PATENT DOCUMENTS 3,007,878 A 11/1961 Alexander et al.
3,139,406 A 6/1964 Mindick et al.
(Continued)

FOREIGN PATENT DOCUMENTS

CN 1115817 A 1/1996
CN 1563574 A 1/2005
(Continued)

OTHER PUBLICATIONS

EPO, European Extended Search Report issued in European Application No. 18159789.9, mailed Jun. 22, 2018.
(Continued)

*Primary Examiner* — Robert S Jones, Jr.
*Assistant Examiner* — Jiangtian Xu
(74) *Attorney, Agent, or Firm* — LORENZ & KOPF, LLP (57) ABSTRACT A process for producing a charge-reversed aqueous silica sol includes: (a) providing a slurry of an acidic cation-exchange solid in an aqueous liquid; (b) providing a starting aqueous silica sol with an alkaline pH and including a monovalent cation(s); (c) contacting the slurry with the starting sol; (d) separating the acidic cation-exchange solid from the mixture (c) to leave a decationised aqueous silica sol with an acidic pH and a reduced monovalent cation(s) content compared to the starting sol; and (e) contacting the decationised sol with a compound(s) including a modifying element(s) that can adopt a +3 or +4 oxidation state to produce a charge-reversed aqueous silica sol whose silica particles include the modifying element(s) on their surface. The S-value of the starting sol is from about 10 to about 50%, and the surface area of colloidal silica particles in the starting sol is at least about 500 $m^2\ g^{-1}$.

7 Claims, 2 Drawing Sheets

(56) References Cited

U.S. PATENT DOCUMENTS

| | | | |
|---|---|---|---|
| 3,252,917 A | 5/1966 | Mindick et al. | |
| 3,620,978 A | 11/1971 | Moore, Jr. et al. | |
| 3,719,607 A | 3/1973 | Moore, Jr. | |
| 3,745,126 A | 7/1973 | Moore, Jr. | |
| 3,864,142 A | 2/1975 | Kovarik | |
| 3,956,171 A | 5/1976 | Moore, Jr. et al. | |
| 5,176,891 A | 1/1993 | Rushmere | |
| 5,368,833 A * | 11/1994 | Johansson | D21H 23/765 423/338 |
| 5,603,805 A | 2/1997 | Andersson et al. | |
| 5,964,693 A | 10/1999 | Brekau et al. | |
| 6,372,806 B1 | 4/2002 | Keiser et al. | |
| 2003/0024671 A1 | 2/2003 | Persson et al. | |

FOREIGN PATENT DOCUMENTS

| | | | |
|---|---|---|---|
| CN | 1613759 A | 5/2005 | |
| CN | 1934032 A | 3/2007 | |
| CN | 101001811 A | 7/2007 | |
| CN | 103896290 A | 7/2014 | |
| CN | 105452167 A | 3/2016 | |
| EP | 0572888 A1 | 12/1993 | |
| WO | 9856715 A1 | 12/1998 | |
| WO | 0066492 A1 | 11/2000 | |
| WO | WO-2005097678 A1 * | 10/2005 | B01F 23/50 |
| WO | 2017162920 A1 | 9/2017 | |

OTHER PUBLICATIONS

EPO, International Search Report issued in International Application No. PCT/EP2019/054928, mailed Mar. 28, 2019.

Iler, R.K. et al., "Degree of Hydration of Particles of Colloidal Silica in Aqueous Solution", Journal of Physical Chemistry, 1956, pp. 955-957, vol. 60, No. 7.

Johansson, G., "On the Crystal Structures of Some Basic Aluminum Salts", Acta Chemica Scandinavica, 1960, pp. 771-773, vol. 14, No. 3.

* cited by examiner 50 nm

CHARGE-REVERSED SILICA SOL

CROSS-REFERENCE TO RELATED APPLICATIONS

This application is a U.S. National-Stage entry under 35 U.S.C. § 371 based on International Application No. PCT/EP2019/054928 filed Feb. 28, 2019, which was published under PCT Article 21(2) and which claims priority to European Application No. 18159789.9 filed Mar. 2, 2018, and European Application No. 18163196.1 filed Mar. 21, 2018, which are all hereby incorporated in their entirety by reference.

TECHNICAL FIELD

The present disclosure relates to charge-reversed silica sols and also to a method for producing such sols. The present disclosure also relates to the use of such silica sols in drainage and retention aids for paper making, or as a flocculating agent for use, for example, in applications such as water treatment or beverage clarification.

BACKGROUND

Silica sols include small, discrete particles of silica suspended in a liquid phase, which is typically aqueous. The pH of the sols is usually alkaline, and the silica particles tend to have a negative charge, counterbalanced by cations in the sol, typically alkali metal cations. The negative charge provides a repulsive force between particles that helps to avoid particle agglomeration and gelation.

It is possible to modify the silica particles such that their surface negative charge is reduced or even reversed to a positive charge. Such "charge-reversed" sols can be stable at lower pH, which is useful in applications where higher, alkaline pH values are undesirable.

One way of making charge-reversed silica sols is to coat or modify the surface of the silica particles with cationic trivalent or tetravalent metal species. An example is described in U.S. Pat. No. 3,007,878, which discloses a method of producing colloidal silica particles coated with a polyvalent metal-oxygen compound by adding a basic salt solution of metals having a valency of 3 to 4 to the silica sol. The result is silica sol particles with surfaces modified with metal oxide, metal hydroxide and/or hydrated metal oxide. U.S. Pat. No. 3,139,406 also discloses a method for producing coated silica colloidal particles, in which a colloidal silica is treated with a trivalent acidic metal salt, where the anions associated with the salt (e.g. chloride ions) are subsequently removed using a strong base anion-exchange resin.

In other processes, the silica sol is first acidified or "decationised" before being treated with trivalent or tetravalent metal. U.S. Pat. No. 3,252,917, for example, discloses a method in which a silica sol is first acidified using a strong acid cation-exchange resin, before being mixed with a basic aluminum halide and subsequently contacted with an anion exchange resin to produce a substantially salt-free, alumina-coated silica sol with a pH in the range of from about 4.5 to about 6.5.

Other processes for coating colloidal silica particles with alumina or other metal oxides are described in U.S. Pat. Nos. 3,864,142, 3,620,978, 3,956,171, 3,719,607, and 3,745,126.

Silica sols and modified silica sols are widely used as drainage and retention aids in papermaking, typically in combination with one or more organic polymers. Examples of silica sols and aluminate-modified silica sols that can be used in paper making are disclosed in U.S. Pat. Nos. 5,368,833, 5,603,805, WO98/56715, WO00/66492, WO2017/162920, U.S. Pat. Nos. 6,372,806, 5,176,891, and EP0572888.

In papermaking processes, an aqueous suspension including cellulosic fibres and optional fillers and additives (referred to as stock) is fed into a headbox, which ejects the stock onto a forming wire. Water is drained from the stock so that a wet web of paper is formed on the wire, and the web is further dewatered and dried in the drying section of the paper machine. Drainage and retention aids are conventionally introduced into the stock in order to facilitate drainage of water, and to increase adsorption of fine particles onto the cellulosic fibres, so that they are retained with the fibres on the wire.

One of the parameters affecting the properties and performance of silica-based sols in such applications is the specific surface area. Stable, high-performance silica-based sols usually include particles with a specific surface area of at least about 300 m2/g. Another parameter is the S value, which indicates the degree of aggregate or microgel formation (Iler & Dalton; J. Phys. Chem. 60(1956), 955-957). A lower S-value is indicative of a higher degree of aggregation. Although high surface areas and a certain degree of aggregate or microgel formation may be advantageous from a performance point of view, very high surface areas and extensive particle aggregation or microgel formation result in considerably decreased stability of silica-based sols, which consequently requires extreme dilution of the sols to avoid gel formation. This is particularly so for high surface area silicas, which are often modified with aluminate, for example, to stabilise the high surface area.

However, even after modification, the aluminate-modified silica sol particles typically carry a negative charge due to the relatively low amounts of aluminate present on the surface. Negatively charged particles tend to be unstable under low pH conditions, which are often used in applications where flocculation is important, for example in water treatment, or in drainage and retention aids for paper making. When the sols are unstable, the particles can aggregate, leading to gelling. If this happens too quickly, e.g. over time periods of less than about 3 months, the water treatment aids or drainage and retention aids are not commercially viable.

There is a need for an improved silica sol that is based on high surface area colloidal silica which is storage stable under relatively low pH conditions, i.e. at pH values in the range of from about 1 to about 7, and which can avoid gelling over a time period of several months, typically at least three months. There is also a need for a method of making such improved silica sols.

In the discussion below, the terms "colloidal silica" and "silica sol" have the same meaning.

Other objects, desirable features and characteristics will become apparent from the subsequent summary and detailed description, and the appended claims, taken in conjunction with the accompanying drawings and this background.

SUMMARY

The present disclosure provides a process for producing a charge-reversed aqueous silica sol comprising the steps of:
(a) providing a slurry of an acidic cation-exchange solid in an aqueous liquid;
(b) providing a starting aqueous silica sol with an alkaline pH, and comprising one or more monovalent cations;

(c) contacting the slurry of (a) and the aqueous silica sol of (b);

(d) removing the acidic cation-exchange solid from the mixture resulting from (c) to leave a decationised aqueous silica sol with an acidic pH, and with a reduced content of monovalent cations compared to the starting aqueous silica sol; and (e) contacting the decationised aqueous silica sol with one or more compounds comprising a modifying element that can formally adopt a +3 or +4 oxidation state, to produce a charge-reversed aqueous silica sol whose silica particles comprise such a modifying element on their surface;

wherein the starting aqueous silica sol has an S-value in the range of from about 10 to about 50%, and the surface area of the colloidal silica particles in the starting aqueous silica sol is at least about 500 $m^2\ g^{-1}$.

The present disclosure is also directed to the charge-reversed aqueous silica sol that is obtainable from such a process.

The present disclosure is additionally directed to a charge-reversed aqueous silica sol, prepared by modifying the surface of colloidal silica particles of a starting aqueous silica sol with one or more modifying elements that can formally adopt a +3 or +4 oxidation state, wherein the starting aqueous silica sol has an S-value of from about 10 to about 50%, the surface area of the starting aqueous colloidal silica particles is at least about 500 $m^2\ g^{-1}$, and wherein the amount of modifying element on the colloidal silica particles in the charge-reversed aqueous silica sol compared to the surface area of the starting colloidal silica particles is in the range of from about 18.4 to about 33 $\mu mol\ m^{-2}$.

The present disclosure is further directed to the use of the charge-reversed aqueous silica sol of the present disclosure as a component of a drainage and/or retention aid system in paper making, or as a flocculant, for example in water purification or beverage clarification.

BRIEF DESCRIPTION OF DRAWINGS

The present disclosure will hereinafter be described in conjunction with the following drawing figures, wherein like numerals denote like elements, and.

In both figures, the scale bar is 50 nm.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

The aqueous silica sols of the present disclosure, referred to herein as a "charge-reversed" silica sol, can be used as flocculating agents in applications such as water purification and beverage clarification (for example beer or wine clarification), and as drainage and/or retention aids in papermaking They exhibit good stability over extended periods of time, notably high surface area stability and high stability against gel formation, while at the same time having a sufficient degree of particle aggregation that imparts effective flocculation properties.

The charge-reversed aqueous silica sols have very good drainage and retention properties when used in papermaking, in particular improved drainage.

In the process of the present disclosure, a conventional silica sol is first provided as a starting silica sol. This starting aqueous silica sol is basic, typically having a pH in the range of from about 8.0 to about 12.0, for example from about 9.0 to about 11.0. Other components of such sols include the presence of one or more monovalent cations, typically selected from alkali metal cations, and organic cations such as quaternary ammonium cations, for example those of general formula NR4+ where each R is independently selected from H and $C_{1-6}$ alkyl where the $C_{1-6}$ alkyl is optionally substituted with one or more groups selected from —OH and —$NH_2$. In embodiments, the monovalent cations are selected from alkali metal cations, for example one or more of lithium, sodium and potassium, and also from ammonium ions (NH4+). Typically sodium is the sole or predominant alkali metal. The alkali metals are often derived from the starting soluble silicate solutions (e.g. water glass) that can be used to make the colloidal silica using conventional processes.

Examples of suitable aqueous alkali metal silicates or water glass that can be used to make the starting aqueous silica sol include conventional materials, e.g. lithium, sodium and potassium silicates, preferably sodium silicate.

The content of alkali metals in the starting silica sol is typically in the range of from about 0.1 to about 5.0 wt %, expressed as alkali metal oxide. In embodiments, it is from about 0.2 to about 3.0 wt %.

The silica concentration in the starting aqueous silica sol is typically in the range of from about 1 to about 40 wt %, for example from about 2 to about 35 wt % or from about 3 to about 30 wt %.

The colloidal silica particles in the starting silica sol typically have a surface area of at least about 500 $m^2\ g^{-1}$, for example greater than about 600 $m^2\ g^{-1}$, such as at least about 610 $m^2\ g^{-1}$ or greater than about 700 $m^2\ g^{-1}$. In embodiments, the surface area is also no more than about 1000 $m^2\ g^{-1}$, for example no more than about 900 $m^2\ g^{-1}$. Examples of ranges of surface areas include from about 500 to about 1000 $m^2\ g^{-1}$, for example from greater than from about 600 to about 1000 $m^2\ g^{-1}$, such as from about 610 to about 1000 $m^2\ g^{-1}$. Further examples of ranges include from about 500 to about 900 $m^2\ g^{-1}$, from about 550 to about 900 $m^2\ g^{-1}$, from greater than about 600 to about 900 $m^2\ g^{-1}$, and from about 610 to about 900 $m^2\ g^{-1}$. The surface area of colloidal silica particles in a silica sol can be calculated from NaOH titration following the method of Sears (Sears; Anal. Chem., 1956, 28(12), 1981-1983).

The colloidal silica particles in the starting silica sol suitably have an average particle diameter ranging from about 2 to about 150 nm, from about 3 to about 50 nm. In preferred embodiments, the average particle diameter is in the range of from about 6 to about 35 nm.

The particle diameters can be calculated from the titrated surface area using a method described in "The Chemistry of Silica", by Iler, K. Ralph, page 465, John Wiley & Sons (1979). Based on the assumption that the silica particles have a density of about 2.2 $g\ cm^{-3}$, and that all particles are of the same size, have a smooth surface area and are spherical, then the particle diameter can be calculated from Equation 1:

$$\text{Particle diameter (nm)} = \frac{2720}{\text{Surface Area (m}^2\text{g}^{-1})} \quad \text{Equation 1}$$

The starting aqueous silica sol typically has an S value in the range of from about 10 to about 50%, and in embodiments from about 10 to about 40%, for example from about 15 to about 35%, from about 20 to about 35% or from about 30 to about 35%. The S-value is measured and calculated as described by Iler & Dalton (Iler & Dalton; J. Phys. Chem. 60(1956), 955-957). The S-value indicates the degree of aggregate or microgel formation and a lower S-value is indicative of a higher degree of aggregation.

The density of the starting aqueous silica sol is at least in part dependent on the silica content, and is typically in the range of from about 1.01 to about 1.20 g cm-3.

The viscosity of the starting aqueous silica sol is typically less than about 40 cP, for example less than about 30 cP, and in particular less than about 20 cP. In embodiments, it is less than about 10 cP. These viscosities are measured at 20.0° C. Viscosities of silica sols, including those described herein, can be measured using a conventional rotational viscometer. A method that can be used is ASTM D4016-14.

The starting sol is typically an aqueous sol, although it can comprise other components, e.g. water-miscible organic solvents, such as one or more lower alcohols (e.g. one or more C1 to C4 alkyl alcohols). If other components are present, they typically constitute less than about 10 wt % of the sol, for example less than about 5 wt %.

In aqueous systems, the colloidal silica particles can be dispersed in the presence of one or more stabilising cations, which are typically selected from $K^+$, $Na^+$, $Li^+$, $NH_4^+$, and organic cations, such as the quaternary ammonium cations of general formula $NR_4^+$ described above.

Examples of sols that can be used as starting aqueous silica sols include silica sols marketed under the name Levasil™ or Bindzil™ from Akzo Nobel.

In the process of the present disclosure, the starting silica sol is mixed with a slurry of an acidic cation exchange solid. This acts to remove alkali metal ions from the starting silica sol and replace them with protons. The effect is to reduce the pH of the sol, to provide a so-called decationised aqueous colloidal silica.

The acidic cation-exchange solid can be selected from organic acidic cation exchange resins or acidic inorganic oxides. The solids are preferably porous. Examples of inorganic oxides include aluminosilicates or silicoaluminophosphates, including porous acidic inorganic oxides with ordered structures, for example zeotype structures detailed in the International Zeolite Association's database of zeolite structures. Examples of organic acidic cation exchange resins include sulfonic acid resins, or phosphonic acid resins. Example resins include those based on cross-linked polystyrene, e.g. divinylbenzene cross-linked polystyrene, suitably modified with acidic groups, such as sulfonic acid or phosphonic groups.

The cation exchange solid used in the process is cationic and has at least part of its ion exchange capacity in the hydrogen form, i.e. an acid cationic ion exchange solid. Strong acid cation exchange resins are conveniently used. Where resins are used, they suitably have at least about 40% of their ion exchange capacity in the hydrogen form, for example at least about 50%, and typically at least about 70% or at least about 80%. An example of a suitable ion exchange resin is Ambersep™ 252-H, which is a macroporous cation exchange resin based on sulphonated crosslinked polystyrene.

The acidic cation exchange solid is first slurried in an aqueous liquid. The aqueous liquid is either water, or comprises water as a predominant component mixed with other miscible components, e.g. water-miscible organic solvents such as lower alcohols (e.g. one or more C1-C4 alkyl alcohols). Where other such components are present, the water is typically present in the liquid at greater than about 50 mol %, such as greater than about 75 mol % or greater than about 90 mol %.

The weight ratio of acidic cation exchange solid to aqueous liquid in the slurry can vary widely, and can depend at least in part on the concentration of silica in the starting aqueous silica sol. However, a convenient weight ratio to use is in the range of from about 0.2:1 to about 5:1. The weight ratio of the starting aqueous silica sol to the slurry (i.e. weight of ion exchange solid plus aqueous liquid) is also variable, although typically it is in the range of from about 1:1 to about 5:1.

The starting aqueous silica sol is mixed with the slurry of acidic cation exchange solid. This is preferably carried out under constant stirring or agitation. The mixing is carried out such that the pH of the mixture becomes acidic, typically achieving a pH of less than about 4.0, for example less than about 3.0. Typically, the pH does not drop below 1.0, and more preferably is maintained at about 2.0 or more, for example in the range of from about 2.0 to about 4.0, or from about 2.2 to about 3.0, to avoid gelling of the sol. If a low enough pH is not reached initially, more acidic cation exchange solid can be added, either directly as a solid or as a slurry.

In the present disclosure, the starting silica sol is mixed with an already formed slurry of acidic cation exchange solid in an aqueous liquid, preferably by adding the silica sol to slurry. This avoids, or at least reduces, any agglomeration or aggregation of the colloidal silica particles when producing the decationised aqueous silica sol, and avoids viscosity increase. This is particularly advantageous for the high surface areas of the silica particles in the starting aqueous colloidal silicas that are used in the present disclosure. This method is preferred over techniques where the acid cation exchange solid is not slurried before contact with the aqueous silica sol, for example, using a column technique, or where the sol is contacted with non-slurried acid cation exchange solid. Such techniques tend to result in high viscosity and unstable decationised silicas, due to significant agglomeration and aggregation of the colloidal silica particles.

In the present disclosure, gelling-resistant and low viscosity decationised silica sols with high surface areas of about 500 $m^2 g^{-1}$ or more can be achieved. This opens up the possibility of producing low viscosity and high stability cation-modified silica sols, that maintain low viscosity (i.e. have low aggregation/agglomeration of the silica particles), even though the surface area of the silica particles is high.

The mixing can be carried out at ambient temperatures, although it is possible to raise the temperature to facilitate the ion exchange process and facilitate leaching of alkali metal ions from the silica particles. If heating is carried out, the temperature is maintained at less than about 50° C., to avoid gelling of the sol. Typically, if heating does take place, the temperature is maintained about 40° C. or less.

The cation exchange solid is removed from the so-formed mixture, typically by filtration or decantation, to leave an aqueous silica sol that has an acidic pH, and comprising a lower concentration of alkali metals compared to the starting aqueous silica sol. This is termed a "decationised" aqueous silica sol.

The pH of the decationised aqueous silica sol is typically in the range of from about 1.5 to about 5, for example in the range of from about 2 to about 4, or from about 2 to about 3.5.

The density of the decationised aqueous silica sol is typically in the range of from about 1.01 to about 1.2 g cm$^{-3}$.

The conductivity of the decationised aqueous silica sol is typically at least about 600 μS cm$^{-1}$. Typically, the conductivity is not more than about 5000 μS cm$^{-1}$. Conductivity of silica sols, including those described herein, can be measured directly, using a conductivity meter.

The silica content of the decationised aqueous silica sol is typically in the range of from about 1 to 30 wt %, for example in the range of from about 2 to about 20 wt %, e.g. from about 2 to about 10 wt %.

The surface areas, viscosities and S values of the decationised aqueous silica sol typically fall within the same ranges as those described above for the starting aqueous silica sol.

The liquid phase of the decationised aqueous silica sol is typically water, although it can comprise other water miscible liquids, such as water-miscible organic solvents such as one or more lower alcohols (e.g. one or more C1 to C4 alkyl alcohols). When such other components are present, they are typically present at less than about 50 mol %, for example less than about 25 mol % compared to the water, and typically less than about 10 mol %.

The decationised aqueous silica sol is then treated so as to modify the surface of the silica particles. The modification is with moieties that comprise elements that can formally adopt a +3 or +4 oxidation state. Examples of such modifying elements include boron, aluminum, chromium, gallium, indium, titanium, germanium, zirconium, tin and cerium. Boron, aluminum, titanium and zirconium are particularly suitable for modifying the silica surface. The present disclosure is particularly suited to aluminum-modified aqueous silica sols.

The surface modification is achieved by contacting the decationised aqueous silica with one or more compounds comprising one or more of the modifying elements. In a preferred embodiment, the modification is achieved by adding the decationised aqueous silica sol to a solution of one or more compounds comprising one or more of the modifying elements. Typically, the source of the one or more modifying elements is in the form of one or more water-soluble salts. The salts preferably do not comprise the modifying element as part of an anion (e.g. the salts preferably do not include anions such as borate or aluminate anions that comprise the modified element). Thus, in preferred embodiments, the salts are selected from those where the modifying element is part of the cation, for example in the form of one or more salts selected from halides, nitrates, sulphates, carboxylates, halocarboxylates, halates, and perhalates. Examples of halides include chloride, bromide. Examples of carboxylates include acetates. Examples of halocarboxylates include chloroacetates, such as trichloroacetate. Examples of halates include chlorate, bromate and iodate. Examples of perhalates include perchlorate, perbromate and periodate. Halides in the form of halohydrates can be used, e.g. chlorohydrates.

The one or more compounds comprising the modifying element can be used directly as a solid, or preferably as a solution, typically an aqueous solution, in which water is the only solvent, or is the predominant component of the solvent, which may also comprise one or more other water-miscible components, e.g. water-miscible organic solvents such as lower alcohols (e.g. one or more C1-C4 alkyl alcohols). Where other such additional components of the solvent are present, the water content is typically greater than about 50 mol %, such as greater than about 75 mol % or greater than about 90 mol % based on the total amount of solvent. In embodiments, the modifying element can be present as a colloid or suspension in a liquid medium, in which the liquid phase is aqueous or predominantly aqueous, as described above.

In embodiments, the decationised sol is introduced to a solution, colloid or suspension (preferably a solution) comprising the modifying element, typically with stirring or agitation to ensure thorough mixing. Mixing can be carried out at ambient temperature, although it can be heated. If heated, the temperature is preferably maintained at less than about 50° C., typically less than about 40° C.

The resulting sol is a charge-reversed aqueous silica sol, in which the previously negatively charged silica sol particles are modified with species comprising the modifying element.

The pH of the charge-reversed aqueous silica sol is typically in the range of from about 3.0 to about 5.0, for example in the range of from about 3.5 to about 4.0.

The S-value of the charge reversed silica particles is in the range of from about 10 to 50%, for example in the range of from about 20 to about 40%, such as from about 25 to about 35%.

The viscosity of the aqueous charge reversed silica sol is typically less than about 40 or less, for example about 30 cP or less, such as about 20 cP or less. In embodiments, it can be about 10 cP or less. These are based on measurements at about 20.0° C.

The stability of the charge-reversed aqueous silica sol is such that its viscosity does not increase by more than about 10% upon storage at room temperature for six months.

In preferred embodiments, the extent of modification with the modifying element is such that the charge-reversed aqueous silica sol comprises about 18.4 μmol of the one or more modifying elements per m$^2$ of the colloidal silica particles in the sol. Typically, the amount is also less than about 33 μmol m$^{-2}$. For example, the amount can be in the range of from about 18.4 to about 33 μmol m$^{-2}$, such as in the range of from about 20 to about 31 μmol m$^{-2}$, for example in the range from about 21 to about 29 μmol m$^{-2}$. The amount of one or more modifying elements is calculated on an elemental basis (i.e. the molar quantity of individual atoms of the one or more modifying elements).

The surface area of the colloidal silica particles in the charge-reversed aqueous silica sol refers to the surface area of the pre-modified colloidal silica particles, i.e. before surface modification with the one or more modifying elements, and is equivalent to the surface area of the colloidal silica particles of the starting aqueous silica sol.

The molar ratio of the modifying element to silica in the charge-reversed silica sol in the modification step can be in the range of from about 0.5:1 to about 5:1, for example in the range of from about 1:1 to about 4:1. As above, the amount of the one or more modifying elements is calculated on an elemental basis, and the amount of silica is based on SiO$_2$.

Typically, in the charge-reversed sol, the weight ratio of the modifying element (expressed in terms of its oxide) to the silica is in the range of from about 0.1:1 to about 10:1, more typically, from about 0.4:1 to about 8:1. In the case of aluminum as the modifying element, the weight ratio of aluminum (expressed as Al$_2$O$_3$) to silica (SiO$_2$) is typically in the range of from about 0.2:1 to about 3:1, for example from about 0.4:1 to about 2:1.

The liquid phase of the charge-reversed aqueous silica sol is typically water, although it can comprise other water miscible liquids, such as water-miscible organic solvents such as one or more lower alcohols (e.g. one or more C1 to C4 alkyl alcohols). When such other components are present, they are typically present at less than about 20 mol % compared to the water, and typically less than about 10 mol %.

Where salts of modifying element are used in the preparation, the resulting charge-reversed aqueous silica sol will also comprise those anions. Preferably, the concentration of these anions in the charge-reversed aqueous silica sol is about 0.7 M or less, preferably about 0.6M or less, and in embodiments about 0.52M or less.

The concentration of anions can be reduced, if desired, by use of an anion exchange solid, typically an anion exchange resin. Examples include styrene/divinylbenzene-based resins, such as Dowex™ Marathon™ A, Lewatit™ S 6268, and Amberjet™ 4200.

Optionally, one or more stabilizing agents can be included in the step of modifying the decationised aqueous silica sol with the modifying element. Typically, these are salts of weak acid anions such as $C_{2-6}$ carboxylate (e.g. acetate, propionate or butyrate), $C_{3-6}$ di-carboxylic acids (such as malonate, adipate, glutarate or succinate), or tricarboxylates such as citrate, and the cations are typically alkaline earth metals. Acetates or citrates are preferred, with magnesium being the preferred cation. If used, they are typically used in minor quantities compared to the amount of modifying element that is to be used. Typically, the weight ratio of the stabilizing agent compared to the compound comprising the modifying element (on a dry basis) is in the range of from about 1:2 to about 1:20, for example from about 1:3 to about 1:10.

The charge-reversed aqueous silica sol can undergo further treatment, for example to remove salt anions associated with the modifying element when introducing it to the decationised silica sol. If the anion concentrations are too high, this can induce aggregation and hence gelling.

Aluminum can be the modifying element. Examples of suitable aluminum compounds that can be added to the decationised aqueous silica sol include sulfate-containing salts such as aluminum sulphate, polyaluminum sulfate, polyaluminum silicate sulfate and alums, halogen-comprising aluminum salts such as aluminum halide, aluminum halohydrate, polyaluminum halide and polyaluminum halosulfate, where the halogen or halo moiety is preferably chlorine, and polyaluminum compounds comprising other anions, for example anions from phosphoric acid and organic acids such as citric acid and oxalic acid. Combinations of one or more aluminum-containing compounds can be used. Alkaline aluminium salts are preferred, in particular aluminum chloride, aluminum chlorohydrate or polyaluminum chloride.

By making an aqueous charge-reversed silica-based sol in the way described above, it is possible to make stable, charge-reversed aqueous silica sols of high surface area silica, with little increase in the viscosity compared to the starting colloidal silica. However, a slight increase in viscosity compared to the starting aqueous silica sol, indicative of increased aggregation of particles, can be advantageous when the charge-reversed silica sols are used as flocculants, e.g. in water treatment or beverage clarification, or in improving the drainage and/or retention properties of paper and other pulp-related sheet products such as board and paperboard, so long as the viscosity remains stable over time.

The aqueous charge-reversed silica-based sol according to this present disclosure is suitable for use as a flocculating agent, for example in the production of pulp and paper, notably as a drainage and retention aid. It is also suitable for use in the field of water purification, both for purification of different kinds of wastewater and for purification specifically of white water from the pulp and paper industry. It can be used in combination with one or more organic polymers which can be selected from cationic, anionic, amphoteric and non-ionic polymers and mixtures thereof. In preferred embodiments, the one or more organic polymers are selected from anionic, amphoteric and non-ionic polymers, and mixtures thereof. If cationic polymers are employed, they are typically used in a mixture of polymers, where the overall net charge of the polymeric mixture is neutral or anionic. The polymers used can be natural polymers or synthetic polymers. The use of such polymers as flocculating agents and as drainage and retention aids is well known in the art. The polymers can be derived from natural or synthetic sources, and they can be linear, branched or cross-linked. Examples of generally suitable main polymers include anionic and amphoteric acrylamide-based polymers, including essentially linear, branched and cross-linked anionic acrylamide-based polymers; as well as melamine-formaldehyde and urea-formaldehyde resins. The molecular weight of the polymer is suitably above about 1,000,000 and preferably above about 2,000,000. The upper limit is not critical; it can be about 50,000,000, usually about 30,000,000 and suitably about 25,000,000. Naturally occurring polymers include amphoteric, anionic, and non-ionic carbohydrates (such as starch and guar gums). The molecular weight of polymers derived from natural sources may be higher that the synthetic polymers.

The present silica-based sol can also be used in combination with cationic coagulant(s), either with or without the co-use of the organic polymer(s) described above. Examples of suitable cationic coagulants include water-soluble organic polymeric coagulants and inorganic coagulants. The cationic coagulants can be used singly or together, i.e. a polymeric coagulant can be used in combination with an inorganic coagulant.

Examples of suitable water-soluble organic polymeric cationic coagulants include polyamideamines, polyethylene imines, dicyandiamide condensation polymers and polymers of water soluble ethylenically unsaturated monomer or monomer blend which is formed of from about 50 to about 100 mole % cationic monomer and from 0 to about 50 mole % other monomer. The amount of cationic monomer is usually at least about 80 mole %, suitably about 100%. Examples of suitable ethylenically unsaturated cationic monomers include dialkylaminoalkyl (meth)-acrylates and -acrylamides, preferably in quaternised form, and diallyl dialkyl ammonium chlorides, e.g. diallyl dimethyl ammonium chloride (DADMAC), preferably homopolymers and copolymers of DADMAC. The organic polymeric cationic coagulants usually have a molecular weight in the range of from about 1,000 to about 700,000, suitably from about 10,000 to about 500,000. Examples of suitable inorganic coagulants include aluminum compounds, e.g. sulfate-containing salts such as aluminium sulphate, polyaluminum sulfate, polyaluminum silicate sulfate and alums, halogen-containing aluminum salts such as aluminum halide, aluminum haloohydrate, polyaluminum halide and polyaluminum halosulfate, where the halogen or halo moiety is preferably chlorine, and polyaluminum compounds comprising other anions, for example anions from phosphoric acid and organic acids such as citric acid and oxalic acid. Combinations of one or more aluminum-containing compounds can be used.

Further examples of suitable anionic, amphoteric and non-ionic polymers and cationic coagulants can be found in WO2017/162920, WO00/66492, WO2005/097678 and WO98/56715.

The components of the drainage and retention aids can be added to the stock in conventional manner and in any order.

The components of the drainage and retention aids as contemplated herein are added to the stock to be dewatered in amounts which can vary within wide limits depending on, inter alia, type and number of components, type of furnish, filler content, type of filler, point of addition, etc. Generally, the components are added in amounts that give better drainage and retention than is obtained when not adding the components. The charge-reversed silica sol is usually added in an amount of at least about 0.001% by weight, often at least about 0.005% by weight, calculated as $SiO_2$ and based on dry furnish, i.e. dry cellulosic fibres and optional fillers, and the upper limit is usually about 1.0% and suitably about 0.5% by weight. The organic polymer is usually added in an amount of at least about 0.001%, often at least about 0.005% by weight, based on dry furnish, and the upper limit is usually about 3% and suitably about 1.5% by weight. When using a cationic polymeric coagulant, it can be added in an amount of at least about 0.05% by weight, based on dry furnish. Suitably, the amount is in the range of from about 0.07 to about 0.5%, preferably in the range from about 0.1 to about 0.35%. When using an aluminum compound as the inorganic coagulant, the total amount added is usually at least about 0.05%, calculated as $Al_2O_3$ and based on dry furnish. Suitably the amount is in the range of from about 0.1 to about 3.0%, preferably in the range from about 0.5 to about 2.0%.

Further additives which are conventional in papermaking can be used in combination with the additives as contemplated herein, such as, for example, dry strength agents, wet strength agents, optical brightening agents, dyes, sizing agents like rosin-based sizing agents and cellulose-reactive sizing agents, e.g. alkyl and alkenyl ketene dimers and ketene multimers, alkyl and alkenyl succinic anhydrides, etc. The cellulosic suspension, or stock, can also comprise mineral fillers of conventional types such as, for example, kaolin, china clay, titanium dioxide, gypsum, talc and natural and synthetic calcium carbonates such as chalk, ground marble and precipitated calcium carbonate.

The charge-reversed aqueous silica sol of this present disclosure can be used for the production of paper. The term "paper" includes not only paper and its production, but also other cellulosic sheet or web-like products, such as board and paperboard. The process can be used in the production of paper from different types of suspensions of cellulose-containing fibres and the suspensions should suitably comprise at least about 25% by weight and preferably at least about 50% by weight of such fibres, based on dry substance. The suspension can be based on fibres from chemical pulp such as sulphate, sulphite and organosolv pulps, mechanical pulp such as thermomechanical pulp, chemo-thermomechanical pulp, refiner pulp and groundwood pulp, from both hardwood and softwood, and can also be based on recycled fibres, optionally from de-inked pulps, and mixtures thereof. The pH of the suspension, the stock, can be within the range of from about 3 to about 10. The pH is suitably above about 3.5 and preferably within the range of from about 4 to about 9.

The present disclosure is further illustrated in the following examples. Parts and % relate to parts by weight and % by weight, respectively, unless otherwise stated.

EXAMPLES

The present disclosure will now be illustrated by the following examples.

Examples 1 to 8

A starting aqueous silica sol was selected, having a surface area of 600 m² g⁻¹, a density of 1.1 g cm⁻³, a silica content of 15 wt %, a pH of 10.5, a viscosity of 8 cP, an S-value of 33%, and a sodium content (expressed as $Na_2O$) of 0.8 wt %.

The decationisation step initially involved adding a cation exchange resin, Ambersep™ 252-H (in H+-form), to a 5 L flask and subsequently adding deionised water to form a slurry.

The starting aqueous silica sol was then added under constant stirring. The pH was monitored. If the pH did not drop below 2.5, some additional Ambersep™ 252-H resin was added.

After reaching pH<2.5, the temperature was increased to 30° C. and the sol was kept at this temperature for 3 h under moderate stirring. The resin was then removed by filtration through a 10 μm filter cloth.

Amounts of materials used are listed in Table 1.

For the charge-reversal step, i.e. modifying the silica particle surface with a modifying element, magnesium acetate tetrahydrate (Columbus Chemical Industries, USA) was dissolved in 500 mL deionised water, and mixed with an aluminum chlorohydrate solution (23.2% Al2O3 Locron™ L, from Clariant). A further quantity of deionised water (740 g) was added to the mixture.

The temperature was increased to 35° C., and the decationised silica sol was added until a total amount of 2520 g had been added. The amounts of materials used are listed in Table 2.

The resulting sol was filtered through a 10 μm filter cloth.

Example 9

A starting aqueous silica sol was selected that had the same properties as the sol of Examples 1 to 8, except that its surface area was 690 m² g⁻¹.

It was decationised and subsequently charge reversed following the same procedure as outlined for Examples 1 to 8 above. The amounts of materials used are listed in Tables 1 and 2.

Comparative Example 10

A starting aqueous silica sol was selected that had the same properties as the starting sol of Examples 1 to 8.

It was decationised by adding 2.5 litres of the starting colloidal silica to a 5 L flask, and directly adding the solid resin Ambersep™ 252-H under stirring. The pH was monitored, and if the pH did not drop below 2.5 some additional Ambersep™ 252-H resin was added.

After reaching pH<2.5, the temperature was increased to 30° C. and the sol was kept at this temperature for 3 h under moderate stirring. The resin was then removed by filtration through a 10 μm filter cloth.

For the charge-reversal step, i.e. modifying the silica particle surface with a modifying element, 16.3 g magnesium acetate tetrahydrate (Columbus Chemical Industries, USA) was dissolved in 500 mL deionised water, and mixed with 1360 g of an aluminum chlorohydrate solution (23.2% Al2O3Locron™ L, from Clariant). A further 741 g deionised water was added to the mixture.

The temperature was increased to 35° C., and decationised sol was added over a period of 5-6 h, at a rate of 6.5 ml min$^{-1}$, until a total amount of 2520 g had been added. The amounts of materials used are listed in Table 2.

The resulting sol was filtered through a 10 µm filter cloth.

TABLE 1

Quantities of materials used in preparing decationised aqueous colloidal silica

| Example | Silica Sol [g] | Water [g] | Resin[1] [ml] | Resin[1] [g] |
|---|---|---|---|---|
| 1 | 2757 | 500 | 450 | 400 |
| 2 | 2757 | 500 | 450 | 400 |
| 3 | 2004 | 800 | 450 | 400 |
| 4 | 2338 | 500 | 450 | 400 |
| 5 | 2338 | 500 | 450 | 400 |
| 6 | 2338 | 500 | 830 | 627 |
| 7 | 2004 | 800 | 700 | 529 |
| 8 | 2004 | 800 | 700 | 529 |
| 9 | 2004 | 800 | 700 | 529 |
| 10 (comp.)[2] | 2272 | 0 | 450 | 400 |

[1]Bulk density of resin is 0.755 g/ml
[2]Example 10 is a comparative example (see below)

TABLE 2

Quantities of materials used in preparing charge-reversed aqueous colloidal silica

| Example | Al$_2$(OH)$_5$Cl (aq) [g] | H$_2$O [g] | Mg(CH$_3$COO)$_2$(H$_2$O)$_4$ [g] | Silica sol addition rate [mL/min] |
|---|---|---|---|---|
| 1 | 723 | 1240 | 25 | 35 |
| 2 | 723 | 1240 | 25 | 50 |
| 3 | 904 | 1240 | 25 | 50 |
| 4 | 904 | 1240 | 25 | 62 |
| 5 | 904 | 1240 | 25 | 62 |
| 6 | 920 | 1240 | 20 | 50 |
| 7 | 904 | 1240 | 25 | 50 |
| 8 | 904 | 1240 | 25 | 60 |
| 9 | 904 | 1240 | 25 | 55 |
| 10 (comp.) | 1360 | 1241 | 16.3 | 6.5 |

Results of Decationisation

The properties of the decationised silica sols are presented in Table 3.

TABLE 3

Properties of decationised aqueous silica sols

| Example | Density [g/mL] | Viscosity [cP] | pH | Conductivity [µS/cm] |
|---|---|---|---|---|
| 1 | 1.0733 | 2.9 | 2.85 | 670 |
| 2 | 1.0735 | 2.9 | 2.90 | 680 |
| 3 | 1.0603 | 2.5 | 2.65 | 780 |
| 4 | 1.0705 | 2.8 | 2.8 | 820 |
| 5 | 1.0705 | 2.8 | 2.75 | 620 |
| 6 | 1.0704 | 2.8 | 2.55 | 800 |
| 7 | 1.0603 | 2.5 | 2.7 | 950 |

TABLE 3-continued

Properties of decationised aqueous silica sols

| Example | Density [g/mL] | Viscosity [cP] | pH | Conductivity [µS/cm] |
|---|---|---|---|---|
| 8 | 1.0603 | 2.5 | 2.6 | 1050 |
| 9 | 1.0603 | 2.5 | 2.7 | 720 |
| 10 (comp.) | | Difficult filtration | 2.7 | |

In Examples 1 to 9, the decationised silica sol samples were easily separated from the resin during the filtration step. This is reflected in the extremely low viscosity of the samples, indicating very low agglomeration and gelling. This was not the case, however, for Comparative Example 10, where filtration was difficult, and the viscosity of the resulting sol was extremely high.

Therefore, by adding colloidal silica to a slurry of acidic cation exchange solid, an intermediate high surface area decationised colloidal silica of acidic pH can be prepared that has sufficient stability for subsequent surface modification treatment.

Results of Charge Reversal

Table 4 provides details of the charge-reversed aqueous silica sols, i.e. after modification with aluminum as the modifying element.

These results show that charge-reversed aqueous silica sols with high surface areas can be prepared with lower viscosities than were previously achievable. In addition, improved stability and viscosity of the intermediate decationised aqueous silica sol can also be achieved by using the improved method of the present disclosure. In addition, control of the extent of surface modification by the modifying element can also have significant effects.

TABLE 4

Properties of charge-reversed aqueous silica sols

| Example | Viscosity [cP] | Al content[1] [µmol Al/m$^2$(SiO$_2$)] | Al content[1] [µmol Al$_2$O$_3$/m$^2$(SiO$_2$)] | Calculated[1] Cl$^-$ [M] |
|---|---|---|---|---|
| 1 | gelled | 13.26 | 6.63 | 0.37 |
| 2 | gelled | 13.26 | 6.63 | 0.37 |
| 3 | 8.2 | 22.80 | 11.40 | 0.49 |
| 4 | 60-70 | 19.56 | 9.78 | 0.49 |
| 5 | 70 | 19.56 | 9.78 | 0.49 |
| 6 | 60 | 19.90 | 9.95 | 0.50 |
| 7 | 9 | 22.80 | 11.40 | 0.49 |
| 8 | 9 | 22.80 | 11.40 | 0.49 |
| 9 | gelled | 18.24 | 9.12 | 0.49 |
| 10 (comp.) | 39 | 34 | 17 | 0.75 |

[1]Calculated values based on the amount of aluminum chlorohydrate used.

A further improvement compared to the comparative example 10 is the reduction in residual anions (chloride) remaining in the charge-reversed silica sol. Reduced residual anions help to preserve the stability of the sol against increasing viscosity, that can result through agglomeration of the colloidal silica particles and subsequent gelling.

Based on the above, the best viscosities are achieved where the extent of modification of the silica sol particle surface is such that the modifying element (in this case aluminum) is present at a concentration of above 18.24 µmol m$^{-2}$ silica, and below 34 µmol m-2 silica. Even better results are achieved if the lower limit is above 19.9 µmol m$^{-2}$.

Table 5 shows the lifetimes of some of the charge-reversed silica sol samples which did not gel after filtration.

TABLE 1

Stability of charge-reversed aqueous silica sols

| Example | Initial viscosity [cP] | Viscosity after 1 month [cP] | Viscosity after 12 months [cP] | $SiO_2$— content[3] [Wt %][1] | $Al_2O_3$— content[3] [Wt %][1] |
|---|---|---|---|---|---|
| 3 | 8.2 | 7.2 | 6.3 | 5.7 | 4.7 |
| 7 | 9 | 7.8 | 6.9 | 5.6 | 4.3 |
| 8 | 9 | 7.0 | 7.1 | 5.6 | 4.4 |
| 10 (Comp.) | 39 | >200[2] | — | 6.5 | 6.5 |

[1]Measured by XRF.
[2]Viscosity after 3 months
[3]Based on XRF measurements

The low viscosity, non-gelled, charge-reversed silica sol samples made according to the process of the present disclosure all had high long-term stability, showing no significant increase in viscosity after a year. The sample prepared by a comparative method showed much more rapid ageing and gelling.

Figure 1:
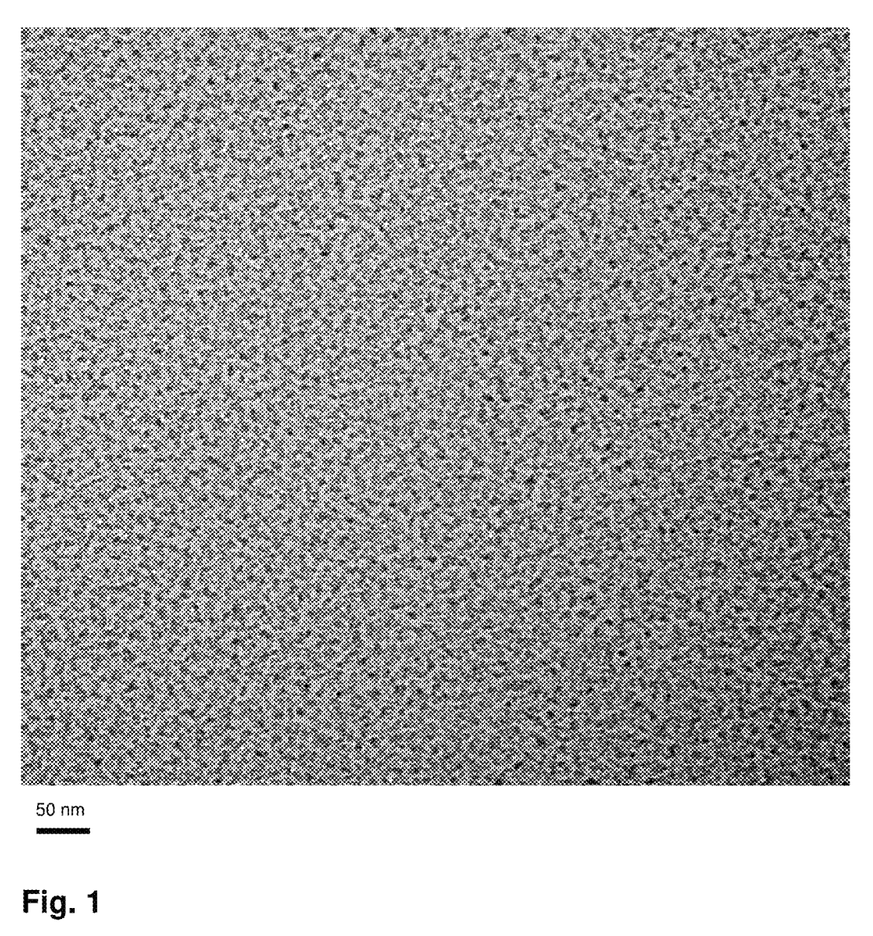
FIG. 1 is a transmission electron micrograph image of a basic aqueous silica sol used to make a charge-reversed aqueous silica sol as contemplated herein.
Figure 2:
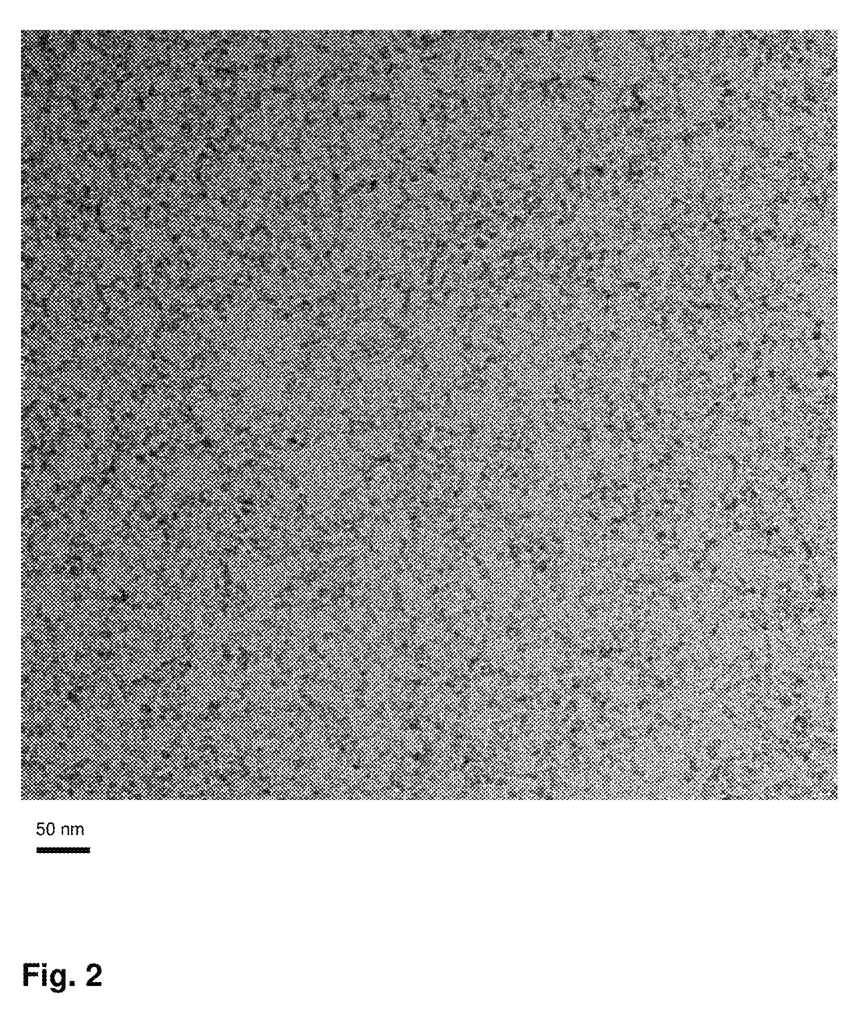
FIG. 2 is a transmission electron micrograph image of a charge-reversed aqueous silica sol as contemplated herein, six months after it was prepared from the basic aqueous silica sol shown in FIG. 1 (c.f. Example 8).

FIGS. 1 and 2 show transmission electron micrographs of, respectively, the starting silica sol, and the charge-reversed silica sol of Example 8 six (6) months after its initial synthesis. Both samples show no significant signs of aggregation of silica sol particles, consistent with their low and stable viscosity values.

The present disclosure has demonstrated that high surface area, low S-value charge-reversed aqueous silica sols that have long, stable lifetime can be made. In view of their commercially viable lifetimes, they are suitable for use where flocculation is required, for example in water treatment or beverage clarification, or as a component of a retention and dewatering aid system in papermaking.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A process for producing a charge-reversed aqueous silica sol comprising the steps of:
    (a) providing a slurry of an acidic cation-exchange solid in an aqueous liquid;
    (b) providing a starting aqueous silica sol with an alkaline pH and comprising one or more monovalent cations and colloidal silica particles;
    (c) contacting the slurry of (a) and the aqueous silica sol of (b) to form a mixture;
    (d) removing the acidic cation-exchange solid from the mixture resulting from (c) to leave a decationised aqueous silica sol with an acidic pH and a reduced content of monovalent cations compared to the starting aqueous silica sol; and
    (e) contacting the decationised aqueous silica sol with one or more compounds comprising one or more modifying elements that is capable of adopting a +3 or +4 oxidation state to produce a charge-reversed aqueous silica sol whose silica particles comprise the one or more modifying elements on a surface of the silica particles;
    wherein the starting aqueous silica sol has an S-value of from about 10 to about 50%, and the colloidal silica particles in the starting aqueous silica sol have a surface area of at least about 500 $m^2 g^{-1}$.

2. The process according to claim 1, wherein an amount of the one or more modifying elements in the charge-reversed aqueous silica sol based on the surface area of the colloidal silica particles in the starting aqueous silica sol is from about 18.4 to about 33 $\mu mol/m^2$.

3. The process according to claim 2, wherein a molar ratio of the one or more modifying elements in the charge-reversed aqueous silica sol based on the surface area of the colloidal silica particles in the starting aqueous silica sol is from about 21 to about 29 $\mu mol/m^2$.

4. The process according to claim 1, wherein one or more of the following conditions apply:
    (i) the pH of the starting aqueous silica sol is from about 8 to about 12;
    (ii) the silica concentration of the starting aqueous silica sol is from about 1 to about 40 wt %;
    (iii) the surface area of the silica particles in the starting aqueous silica sol is from about 550 to about 900 $m^2 g^{-1}$;
    (iv) the S value of the starting aqueous silica sol is from about 10 to about 40%;
    (v) the starting aqueous silica sol has a viscosity of about 40 cP or less, measured at about 20° C.;
    (vi) the one or more monovalent cations is selected from alkali metal cations and quaternary ammonium cations;
    (vii) the silica content of the starting aqueous silica sol is from about 1 to about 40 wt %;
    (viii) the one or more modifying elements is selected from boron, aluminum, chromium, gallium, indium, titanium, germanium, zirconium, tin, and cerium; and
    (ix) the starting aqueous silica sol is added to the slurry of acidic cation exchange solid.

5. The process according to claim 1, wherein the acid cationic ion exchange solid is a strong acid cation exchange resin.

6. The process according to claim 1, wherein one or more of the following conditions apply:
    (i) the pH of the decationised aqueous silica sol is from about 1.5 to about 5;
    (ii) the conductivity of the decationised aqueous silica sol is at least about 600 $\mu S\ cm^{-1}$;
    (iii) the silica content of the decationised aqueous silica sol is from about 1 to about 30 wt %;
    (iv) the starting aqueous silica sol comprises alkali metal cations with a content of from about 0.1 to about 5.0 wt %, expressed as alkali metal oxide; and
    (v) aluminum is the only modifying element or is at least one of the one or more modifying elements.

7. The process according to claim 1, wherein one or more of the following conditions apply:
    (i) the decationised aqueous silica sol is added to a solution comprising the one or more compounds comprising the one or more modifying elements;
    (ii) the pH of the charge-reversed aqueous silica sol is from about 3 to about 5;
    (iii) the viscosity of the charge-reversed aqueous silica sol is about 40 cP or less measured at about 20° C.;

(iv) the viscosity of the charge-reversed aqueous silica sol increases by no more than about 10% over a 12 month period;
(v) the mole ratio of the modifying element (on an elemental basis) to the silica in the charge reversed silica sol is from about 0.5:1 to about 5:1;
(vi) the weight ratio of modifying element (on an oxide basis) to silica in the charge-reversed silica sol is from about 0.1:1 to about 10:1.

\* \* \* \* \*